United States Patent

Georgoudis et al.

[15] 3,660,010
[45] May 2, 1972

[54] TREATING TEXTILES WITH SOIL RELEASE AGENTS

[72] Inventors: Paul C. Georgoudis, Dunellen; Dilip K. Ray-Chaudhuri, Somerset, both of N.J.

[73] Assignee: National Starch and Chemical Corporation, New York, N.Y.

[22] Filed: Dec. 17, 1969

[21] Appl. No.: 886,031

[52] U.S. Cl. ...............................8/115.6, 8/116.2, 8/116.3, 8/116.4, 117/138.8 A, 117/138.8 F, 117/139.4, 117/139.5 A, 117/143 A, 117/161 KP
[51] Int. Cl. ..................................D06m 15/12, B32b 27/40
[58] Field of Search ................117/139.5 A, 143 A, 138.8 F, 117/138.8 A, 161 KP; 8/116.2, 115.6, 116.3, 116.4; 260/29.2 TN, 29.4 R, 75 NK, 77.5 AT, 858

[56] References Cited

UNITED STATES PATENTS

| | | | |
|---|---|---|---|
| 3,044,898 | 7/1962 | Habib | 117/76 |
| 3,061,470 | 10/1962 | Kuemmerer | 117/138.8 |
| 3,377,249 | 4/1968 | Marco | 8/115.6 |
| 3,405,003 | 10/1968 | De Paolo | 117/139.5 |
| 3,459,716 | 8/1969 | Schaefer et al. | 117/139.5 |

*Primary Examiner*—William D. Martin
*Assistant Examiner*—Theodore G. Davis
*Attorney*—James and Franklin

[57] ABSTRACT

A process of treating textiles with soil release agents to impart soil release properties thereto, said soil release agents being water soluble, hydroxyl terminated polyurethanes.

2 Claims, No Drawings

TREATING TEXTILES WITH SOIL RELEASE AGENTS

It is known that textiles derived from various synthetic fibers inherently tend to be hydrophobic and to thereby accumulate static electrical charges. Likewise, textiles derived from cellulosic and other natural occurring fibers, while not inherently hydrophobic, are often rendered so by their treatment with various finishing agents such, for example, as the resins utilized to impart durable press and crease resistant properties. It is believed that it is this static electrical charge which tends to hold soil and other oily particles within the lattice formed by the interwoven textile fibers as well as on the surface of the individual fibers. It would be desirable, therefore, to provide some means of negating the inherent charge of such textiles and to thereby enable soil and other oily particles to be readily removed or repelled therefrom.

It is, accordingly, the principal object of our invention to provide an effective water soluble, soil release agent suitable for application to textiles produced from synthetic and natural occurring fibers or blends thereof.

Another object of our invention is to provide textiles displaying soil release properties as a result of having been treated with a water soluble, soil release agent of the present invention.

Other objects and advantages of this invention will be apparent from the following disclosure thereof.

We have found that textiles which have been treated with the novel water soluble, hydroxyl terminated polyurethanes of the present invention, in accordance with the method of our invention will exhibit a significant increase in their soil release properties. We have also found that the redeposition of dirt and soil particles onto the garment being washed is minimized during a conventional washing cycle with garments which have been made from textiles which have been treated with the soil release agents in accordance with the present invention. Furthermore, it is an advantage of the present invention that the thus-imparted soil release properties are surprisingly long-lasting and survive repeated launderings.

The novel, water soluble, hydroxyl terminated polyurethanes which serve as the soil release agents of this invention comprise the products of the reaction of a specified polyalkylene glycol or polyol with an organic isocyanate, said reaction being run at temperatures ranging from about 0° to 200° C., and preferably at from about 60° to 100° C.

Various organic isocyanates can be employed, singly or in combinations of two or more, in the preparation of the water soluble, hydroxyl terminated polyurethanes which are utilized in the process of this invention, among which are included diisocyanates such as aromatic and aliphatic-aromatic diisocyanates, polymethylene diisocyanates and cycloalkylene diisocyanates; triisocyanates and polyisocyanates. Specific examples of isocyanate compounds include: 2,4- and 2,6-tolylene diisocyanate; 4,4'-methylene-bis (phenylisocyanate); 1,6-hexamethylene diisocyanate; lysine diisocyanate; saturated 2,4- and 2,6-tolylene diisocyanate; saturated 4,4'-methylene-bis (phenylisocyanate); reaction products of trimethylol ethane and 2,4- and 2,6-tolylene diisocyanate; reaction products of trimethylol propane and 2,4- and 2,6-tolylene diisocyanate; reaction products of trimethylol ethane and 4,4'-methylene-bis (phenylisocyanate); reaction products of trimethylol propane and 4,4'-methylene-bis (phenylisocyanate); reaction products of pentaerythritol and 2,4- and 2,6-tolylene diisocyanate; and, reaction products of 1,6-hexamethylene diisocyanate and water. Isothiocyanates and sulfonylisocyanates can also be employed in preparing the novel polyurethanes of this invention.

Among the polyalkylene glycols and polyols suitable for use in preparing these polyurethanes are: ethylene glycol, diethylene glycol, triethylene glycol, tetraethylene glycol, polyethylene glycols having a molecular weight of from about 200 to 20,000, methoxy polyethylene glycols having a molecular weight of from about 200 to 20,000, propylene glycol, dipropylene glycol, tripropylene glycol, polypropylene glycols having a molecular weight of from about 200 to 20,000, butane diols, pentane diols, hexane diols, trimethylol ethane, trimethylol propane, pentaerythritol, sorbitol, and polytetramethylene ether diols having a molecular weight of from about 200 to 20,000. Also useful are the reaction products of trimethylol ethane, trimethylol propane and pentaerythritol with alkylene oxides such as ethylene and propylene oxide, as well as polyester diols such, for example, as the reaction product of terephthalic acid and polyethylene glycol having a molecular weight of at least about 1,000, and, the reaction product of tri-mellitic anhydride and polyethylene glycol having a molecular weight of at least about 600. Thus, any polyalkylene glycol or polyol having a molecular weight of from 62 to about 20,000 and containing at least one hydroxyl group may be used in preparing these urethane polymers. Mixtures of such compounds may also be utilized.

Although the presence of an organic solvent or solvent mixtures is not particularly required, their use in the preparation of these polyurethanes does aid in controlling the rate of reaction, primarily by heat transfer. Typical solvents which may be used in preparing these polymers include: ethyl acetate, dioxane, tetrahydrofuran, methylene chloride, acetone, methyl ethyl ketone, methyl isobutyl ketone, toluene, dimethyl sulfoxide, nitropropane, N,N'-dimethylformamide, etc. Solvents which contain reactive functional groups, such as carboxyl and amino groups, are not desirable for this purpose since they would take part in the reaction.

A catalyst is often used in order to promote the reaction between the organic isocyanate and the glycol or other hydroxyl containing compound in forming the polyurethanes of this invention. Any catalysts known to be useful in catalyzing conventional urethane reactions can be employed and as contemplated in this invention, such catalysts should be present in a concentration of from about 0.01 to 1.0 percent, by weight, based on the total weight of the reactants, i.e. the polyalkylene glycol or polyol and the isocyanate. Examples of commonly used catalysts which are suitable for use herein include tertiary amines such as 1,4-diazabicyclo [2.2.2] octane, and heavy metal salts and organometallic compounds such as lead octoate, phenyl mercuric propionate, stannous octoate, dibutyl tin dioctoate, dibutyl tin dilaurate and tributyl tin oxide. The use of dibutyl tin dilaurate or 1,4-diazabicyclo [2.2.2] octane is preferred in most instances.

In preparing the novel water soluble, hydroxyl terminated urethane polymers of this invention, the proportions of the reactants must be so chosen as to provide from 1.01 to 2 hydroxyl groups as contained in the polyalkylene glycol or polyol molecule for every isocyanate group of the selected isocyanate compound. In practice, it has been found that the preferable proportions range from about 1.05 to 1.2 of the hydroxyl groups to 1 isocyanate group.

An excess of the hydroxyl groups of the polyalkylene glycol or polyol with respect to the isocyanate groups is particularly important and is required in order to result in a polyurethane which is hydroxyl terminated.

As will be appreciated by those skilled in the art, the use of a methoxy-containing polyalkylene glycol, such, for example, as methoxy polyethylene glycol, in place of a simple polyethylene glycol in the reaction with a selected isocyanate according to this invention, will yield a methoxy terminated polyurethane. Of course, partial substitution of the polyalkylene glycol with a methoxy-containing polyalkylene glycol will yield a polyurethane product which is a mixture of hydroxyl terminated and methoxy terminated molecules. Thus, for the purposes of this invention it is intended that the term "hydroxyl terminated polyurethanes" be understood to also include methoxy terminated polyurethanes as well as mixtures of hydroxyl terminated and methoxy terminated polyurethanes.

The water solubility of the polyurethanes of the present invention is derived to a large extent by means of employing, in their preparation, only those polyalkylene glycols and polyols which themselves are water soluble. By the use of the term "- water soluble, hydroxyl terminated polyurethane" it is intended to denote, in this invention, a hydroxyl terminated polyurethane which is not less than about 1 percent, by weight, soluble in water at room temperature. The molecular weight of the polyurethanes of the present invention will ordinarily be within about 1,000 to 50,000.

In carrying out a typical reaction for the preparation of these polyurethanes of this invention, all of the reactants may be initially charged into a suitable reactor or the reactants may be introduced individually, either at a slow or rapid rate of addition depending on the reactivity of the selected isocyanate. The reaction should proceed until all of the isocyanate has been reacted, which ordinarily requires a period of from about 1 to 20 hours. Preferable reaction temperatures range from about 60° to 100° C. and relatively longer reaction periods are needed when lower reaction temperatures are employed. After the reaction has been completed, i.e. after all of the isocyanate is consumed, the solvent is ordinarily removed by distillation. Where a water miscible solvent such, for example, as tetrahydrofuran is used, its removal is not absolutely essential. These polymers, which are pale amber in color, or colorless, are obtained in liquid, semi-solid or solid form and are subsequently dissolved in water prior to their use as soil release agents.

The actual procedure to be used in applying these water soluble hydroxyl terminated polyurethanes to a selected textile substrate is not critical and the practitioner may select any convenient technique such, for example, as spraying, coating or dipping. The polyurethanes should be applied to the textiles from a treating bath comprising an aqueous solution having a polyurethane resin content of from about 1 to 10 percent, by weight. The average dry polyurethane resin solids pickup on the textile should range from about 0.2 to 4 percent, by weight, as based on the total weight of the treated textile.

It is seen, therefore, that in contrast to sizes and other materials intended to provide surface coatings for textiles, the use of only a relatively low concentration of the water soluble, hydroxyl terminated polyurethanes of this invention is required in order to provide effective soil release properties to the textile being processed.

In order to afford a durability of the soil release properties imparted to the fabrics by the polyurethanes of this invention a polyfunctional, crosslinking resin, such, for example, as a permanent press textile resin, together with a resin curing catalyst is admixed with the aqueous solution containing the polyurethane, i.e. treating bath which is used to treat the textile substrate. It is believed, in brief, that the polyfunctional, crosslinking resin serves to associate with the hydroxyl groups of the hydroxyl terminated polyurethane as well as with the hydroxyl groups of the textile substrate and in this manner affords the treated fabric a durable soil release finish. The thus-reacted polyurethane has a degree of permanence which permits garments which were made from such treated fabrics to go through many washing cycles without any appreciable loss of their soil release properties. The incorporation of the polyfunctional, crosslinking resin thus imparts permanent press characteristics to the treated fabric as well as affording durability of the soil release properties.

Typical of such suitable polyfunctional, crosslinking resins are included urea formaldehydes such, for example, as propylene urea formaldehydes and dimethylol urea formaldehyde; melamine formaldehydes such, for example, as trimethylol melamine and pentamethylol melamine; ethylene ureas such, for example, as dimethylol ethylene urea; diureas such, for example, as trimethylol acetylene diurea; the condensation products of formaldehyde and acrolein and of formaldehyde and acetone; alkylol amides such, for example, as methylol acetamide; acrylamides such, for example, as N-methylol acrylamide and N-methylol-N-methacrylamide; haloethylene acrylamide; triazones such, for example, as dimethylol-N-ethyl triazone; halotriazones; haloacetamides such, for example, as N-methylol-N-methylchloracetamide; alkyl carbamates such, for example, as dimethylol methyl carbamate and dimethylol hydroxyethyl carbamate; urons such, for example, as dimethylol uron and dihydroxy dimethylol uron; and the like. Mixtures of two or more of such polyfunctional, crosslinking resins may likewise be used, of course.

The amount of polyfunctional, crosslinking resin employed in the treating bath may vary from about 2 to 30 percent, by weight. Preferably, a concentration ranging from about 5 to 15 percent, by weight, is sufficient, however. The average dry pickup of the polyfunctional crosslinking resin solids should range from about 4 to 14 percent, by weight as based on the total weight of the treated fabric.

A suitable resin curing catalyst, such as is ordinarily used in connection with the curing of conventional permanent press resins, is admixed with the aqueous polyurethane solution used in applying the polyurethane to the textile. As is well known in the art, either an acidic or a basic or both types of catalysts are required depending on the types of functional groups present in the selected polyfunctional, crosslinking resin. Thus, if the resin employed has functional groups that are reactive under acidic conditions then an acidic catalyst is required. If the resin employed has functional groups that are reactive under basic conditions then a basic catalyst is required. If the resin employed has both types of functional groups then both types of catalysts must be used, particularly noting that one of the selected catalysts must be latent, i.e. the latent catalyst must remain inactive during the reaction initiated by the other active catalyst. Illustrative of such acid type resin curing catalysts are magnesium chloride, zinc nitrate, zinc fluoroborate, and monoethanolamine hydrochloride. Illustrative of base acting catalysts are potassium carbonate, potassium bicarbonate, barium carbonate, and lauryl trimethyl ammonium hydroxide. Suitable latent base acting catalysts include alkali metal salts such, for example, as sodium carbonate.

Ordinarily, the acid acting catalysts are employed in the treating bath in a concentration of from about 1 to 7 percent, by weight, although concentrations as high as about 15 percent may be employed if necessary. The base acting catalysts are employed, ordinarily, in a concentration of from about 2 to 16 percent, by weight. The actual concentration of catalyst required for optimum results is dependent on the temperature used in the curing step, and the practitioner can easily determine the most useful concentration required based on specified operating conditions.

Where desired by the practitioner, various optional additives such, for example, as softeners, surfactants, silicone-containing compounds, wetting agents, etc., may also be present in the treating bath in order to effect certain desired modifications of operating conditions or of the resultant treated fabric. Such additives may ordinarily be present in the treating bath used herein in a concentration up to about 5 percent, based on the total weight of the treating bath.

After the application of our soil released formulation to a textile, the thus-treated textile is dried by means of any convenient procedure, ordinarily employing temperatures of from about 220° to 300° F. for a period of from about 1 to 4 minutes. Heating the dry fabric at temperatures of from about 310° to 400° F. for a period of from about 3 to 7 minutes is required to cure the polyfunctional, crosslinking resin which crosslinks or associates with the hydroxyl groups of the polyurethane and the hydroxyl groups of textile substrate and effectively serves to set the polyurethane to the fabric so that it will not easily be washed away during subsequent washes.

In some instances, in order to obtain full benefit of the permanent press properties of the treated fabric, it may be desirable to postpone the curing step, i.e. the heating of the dry fabric at the specified high temperatures, until after the dry fabric has been made into a garment or the like. In this variation the curing may take place during subsequent pressing wherein the garment is pressed in a conventional pressing operation or wherein the garment which is lightly pressed is subjected to an oven for the required period of time.

Thus, it is a particular advantage of the soil release agents of this invention that in view of being water soluble they do not require the use of any organic solvents or vehicles in their application to the textiles. Particularly significant among such inherent advantages of our soil release agents are the economy of operation and safety derived from utilizing a solvent-free, non-flammable system.

All natural occurring and synthetic textiles may be treated with the novel polyurethanes of this invention. Thus, the products of this invention can be used to treat fabrics derived from such natural fibers as cotton, wool, linen and silk or from synthetic fibers such as polyesters, polyacrylics, polyamides, polyolefins, rayon and cellulose acetate as well as blends of various natural fibers or of various synthetic fibers or of natural and synthetic fibers.

While the treating of textile fabrics to impart soil resistance in the above-described manner is preferred, it is contemplated that the novel soil release agents of this invention may also, if desired, be incorporated directly into the melts of the polymeric materials from which the synthetic fibers are obtained, thus eliminating any need for their subsequent application to the fabrics woven from such synthetic fibers.

Likewise, it is to be noted that in variations of the process described herein, the polyurethane soil release agents need not necessarily be applied simultaneously with the polyfunctional, crosslinking resin. Thus, if desired by the practitioner, the polyurethane and the polyfunctional, crosslinking resin may be applied separately, in any desired order.

The following examples will further illustrate the embodiment of this invention. In these examples all parts are by weight unless otherwise noted.

EXAMPLE I

This example illustrates the preparation of a water soluble, hydroxyl terminated polyurethane typical of the products of this invention and its use as a soil release agent in accordance with the process of this invention.

A total of 34.8 parts of a mixture containing 2,4- and 2,6-tolylene diisocyanate in a proportion of 80/20, 433.6 parts of a polyethylene ether glycol having a molecular weight of 950–1,050, 0.23 part of dibutyl tin dilaurate and 117.4 parts of ethyl acetate were added to a suitable reactor equipped with means for mechanical agitation. The reaction mixture was slowly heated to a temperature 85° to 90° C. and was maintained at this temperature for 5.5 hours at which point all of this isocyanate had been completely reacted. The ethyl acetate was then recovered by distillation and the hydroxyl terminated polyurethane in the form of a slightly viscous, clear, colorless liquid was cooled and diluted with water so as to yield an aqueous solution having a concentration of 50 percent, by weight, of resin solids.

An aqueous solution of the above product, diluted to a resin solids content of about 4 percent, by weight, and which also contained about 11 percent, by weight, of dimethylol hydroxyethyl carbamate, a typical polyfunctional, crosslinking permanent press type resin, and 1.7 percent, by weight of magnesium chloride hexahydrate, was prepared and used to treat an undyed 8 × 10 inch swatch of a 50/50 polyethylene terephthalate/cotton fabric blend by passing the swatch through a pad box containing the treating bath therein. A nip roller was used to squeeze the fabric so as to result in a 0.4 percent, by weight, dry pick-up of the polyurethane resin. The wetted fabric was dried in an oven set at 275° F. for a period of 2 minutes and thereafter subjected to a temperature of 340° F. for a period of 5 minutes in order to cure the resin.

Swatches of thus-treated fabric along with a control comprising a swatch of the identical polyethylene terephthalate/cotton fabric which had been treated in an identical manner with a similar treating bath which, however, contained no polyurethane of this invention were machine-washed as part of a load of soiled clothing. After drying and pressing, the treated swatch was considerably brighter than the control which had picked up a noticeable gray cast, thereby demonstrating a particular feature of the polyurethane resins of this invention in preventing the redeposition of soil during washing of fabrics which have been treated therewith.

EXAMPLE II

This example illustrates the preparation of another polyurethane resin typical of the novel products of this invention.

In a repetition of the procedure employed in Example I hereinabove, 69.6 parts of a mixture containing 2,4- and 2,6-tolylene diisocyanate in a proportion of 65/35, 468 parts of a polyethylene ether glycol having a molecular weight of about 1,015, 0.25 parts of dibutyl tin dilaurate and 60 parts of ethyl acetate were heated at a temperature of from 82° to 93° C. for a period of 3.5 hours. The ethyl acetate was then recovered by distillation and the resulting product, in the form of a slightly viscous, clear, colorless liquid, was cooled and diluted with water so as to yield an aqueous solution having a concentration of 50 percent, by weight, of resin solids.

EXAMPLE III

This example illustrates the preparation of additional water soluble, hydroxyl terminated polyurethanes typical of the novel products of this invention.

The following compositions of various polyurethanes of this invention were prepared, essentially, by means of the procedure described in Example I.

| Composition A: | Parts |
|---|---|
| Mixture of 2,4- and 2,6-tolylene diisocyanate (80/20) | 87 |
| Polyethylene ether glycol, M.W. 608 | 465 |
| 1,4'-Diazabicyclo [2.2.2] octane | 0.28 |
| Ethyl acetate | 138 |

The mixture was heated at a temperature of 88°–89° C. for a period of 5.5 hours.

| Composition B: | |
|---|---|
| Mixture of 2,4- and 2,6-tolylene diisocyanate (80/20) | 158 |
| Trimethylolethane | 36 |
| Polyethylene ether glycol, M.W. 608 | 577 |
| Dibutyl tin dilaurate | 0.75 |
| Ethyl acetate | 181 |

The mixture was heated at a temperature of 55°–62° C. for a period of 11 hours.

| Composition C: | Parts |
|---|---|
| A reaction product of trimethylolpropane and tolylene diisocyanate (1:3), sold under trade name Trancoa 375B, Trancoa Chemical Co., Reading, Mass | 30 |
| Polyethylene ether glycol, M.W. 1,020 | 212 |
| Dibutyl tin dilaurate | 0.2 |
| Tetrahydrofuran | 100 |

The mixture was heated at a temperature of 81°–82° C. for a period of 3 hours.

| Composition D: | |
|---|---|
| Lysine diisocyanate | 42.4 |
| Polyethylene ether glycol, M.W. 1,020 | 433.6 |

| | |
|---|---|
| Dibutyl tin dilaurate | 0.24 |
| Ethyl acetate | 119 |

The mixture was heated at a temperature of 94°–95° C for a period of 5 hours.

Composition E:

| | |
|---|---|
| 4,4'-methylene-bis (phenylisocyanate) (saturated) | 26.2 |
| Polyethylene ether glycol, M.W. 1,020 | 129.5 |
| Dibutyl tin dilaurate | 0.16 |
| Tetrahydrofuran | 80.0 |

The mixture was heated at a temperature of 77°–82° C. for a period of 5 hours.

Composition F:

| | |
|---|---|
| A reaction product of dimethyl terephthalate and polyalkylene ether glycol, M.W. 1,790 | 151 |
| Mixture of 2,4- and 2,6-tolylene diisocyanate (80/20) | 7 |
| Dibutyl tin dilaurate | 0.08 |
| Ethyl acetate | 158 |

The mixture was heated at a temperature of 80°–85° C. for a period of 3.0 hours.

EXAMPLE IV

This example illustrates the use and soil release properties of the above-prepared water soluble, hydroxyl terminated polyurethanes of this invention in treating fabrics by means of a formulation which incorporates a permanent press resin as well as the soil release agent.

In a series of experiments, each of the products of Examples II and III, respectively, were incorporated into the following formulation which was subsequently used to treat both 50/50 and 65/35 polyethylene terephthalate/cotton fabric blends.

| Ingredients | Parts |
|---|---|
| A permanent press resin comprising ethylene-dimethylol urea, 45% resin solids, by weight. (Permafresh 183 sold by Sun Chemical Corp., Harrison, N.J.) | 25 |
| Aqueous solution of a water soluble, hydroxyl terminated polyurethane of Examples II and III, 50% resin solids, by weight | 5 |
| Glycollic acid catalyst, 30%, by weight, aqueous solution | 5 |
| Surfactant-mixture of glyceryl monoricinoleate glyceryl diricinoleate | 0.08 |
| Water | 65 |

Each of the thus-prepared treating formulations was padded, respectively, onto swatches of each of the fabric blends with an average dry pick-up of resin solids of 11 – 16 percent, by weight, indicating a dry polyurethane resin pick-up of about 2.1 – 3.0, by weight. The treated fabric was dried in an oven set at 275° F. for a period of 2 minutes and thereafter was subjected to a temperature of 340° F. for a period of 5 minutes.

After the completion of the curing step, all of the test swatches, together with control swatches which had been treated in an identical manner with a similar treating formulation which, however, contained no polyurethane, were subjected to a washing cycle using a detergent at 140° F. for a period of 40 minutes, followed by a cold water rinse. An additional set of treated and control swatches was subjected to 5 washing cycles.

All of the swatches were thereafter stained in two spots with motor oil and a purple dye (Dye No. 49, National Aniline, 0.5 percent in castor oil) respectively, after which the swatches were subjected to a final washing cycle.

The effect of the soil release agent in imparting soil release properties to fabric treated therewith was determined by means of a photovolt meter which measures the intensity of the residual stain in comparison to a surface which was devoid of any applied stain. A meter reading of 78 was taken as the average reading of the white, unstained fabric. Readings of the various test swatches, stained after 1 and 5 wash cycles, respectively, and of the control swatches are summarized in the following table.

The data given in Table I in the column under H.D. (Heat Discoloration) represents photovolt meter readings of the various treated and cured swatches taken after subjecting the swatch to 1 wash and thereafter heating it to a temperature of about 325° F. for a period of 10 minutes. A reading of 78 was obtained as the average reading of the white, unstained fabric used as the control.

TABLE I

| Polyurethane | Fabric composition synthetic cotton | H.D.* | After 1 wash Oil | After 1 wash Dye | After 5 washes Oil | After 5 washes Dye |
|---|---|---|---|---|---|---|
| Product of Example II | 50/50 | 67 | 65 | 40 | 65 | 50 |
| | 65/35 | 76 | 60 | 23 | 45 | 13 |
| Product of Ex. III, Formulation A | 50/50 | 76 | 67 | 50 | 62 | 49 |
| | 65/35 | 72 | 72 | 35 | 70 | 32 |
| Product of Ex. III, Formulation B | 50/50 | 72 | 64 | 47 | 65 | 48 |
| | 65/35 | 74 | 70 | 41 | 71 | 45 |
| Product of Ex. III, Formulation C | 50/50 | 78 | 70 | 50 | 62 | 48 |
| | 65/35 | 76 | 71 | 40 | 72 | 43 |
| Product of Ex. III, Formulation D | 50/50 | 78 | 63 | 51 | 51 | 46 |
| | 65/35 | 77 | 75 | 35 | 70 | 35 |
| Product of Ex. III, Formulation E | 50/50 | 71 | 70 | 41 | 65 | 41 |
| | 65/35 | | | | | |
| Product of Ex. III, Formulation F | 50/50 | 75 | 72 | 46 | 70 | 47 |
| | 65/35 | 77 | 74 | 34 | 70 | 32 |
| Control, no soil release agent was used | 50/50 | 78 | 40 | 20 | 42 | 19 |
| | 65/35 | 78 | 31 | 15 | 38 | 16 |

\* Heat discoloration.

Thus, a comparison of the meter readings of the test swatches, both after 1 and 5 washes, and the control swatches shows the fabric which was treated in accordance with this invention to possess significant soil release properties. Needless to say, meter readings close to 78 represent weak staining while the lower readings represent strong staining. Moreover, none of the treated swatches show any significant yellowing or heat discoloration after being subjected to the heat discoloration procedure described above.

Summarizing, it is seen that this invention provides novel soil release agents, means of treating fabrics therewith, as well as so-called soil release fabrics. Variations may be made in materials, proportions and procedures without departing from the scope of this invention.

We claim:

1. A process for imparting soil release properties to a textile fabric which comprises the steps of: applying thereto an aqueous solution of a water soluble, hydroxyl terminated polyurethane comprising the reaction product of at least one isocyanate compound selected from the group consisting of diisocyanates, triisocyanates and polyisocyanates with at least one hydroxyl containing compound selected from the group consisting of polyalkylene glycols and polyols, the proportion of the selected reactants providing from about 1.01 to 2 hydroxyl groups as supplied by the hydroxyl containing compound to 1 isocyanate group, and a permanent press polyfunctional, crosslinking resin and resin catalyst therefor, said hydroxyl terminated polyurethane being present in a range of about 1 to 10 percent, by weight, and said polyfunctional crosslinking resin being present in a range of about 2 to 30 percent, by weight, based on the weight of said aqueous solution, drying the thus-treated textile fabric at temperatures of from about 220° to 300° F. and thereafter heating said textile fabric at temperatures of from 310° to 400° F.

2. A textile fabric exhibiting soil release properties, said fabric having on its surface a coating comprising the dried consolidated residue of a water soluble, hydroxyl terminated polyurethane comprising the reaction product of at least one isocyanate compound selected from the group consisting of diisocyanates, triisocyanates and polyisocyanates with at least one hydroxyl containing compound selected from the group consisting of polyalkylene glycols and polyols, the proportion of the selected reactants providing from about 1.01 to 2 hydroxyl groups as supplied by the hydroxyl containing compound to 1 isocyanate group, and a permanent press polyfunctional, crosslinking resin and catalyst therefor, said hydroxyl terminated polyurethane being present in a range of about 0.2 to 4 percent, by weight, as based on the total weight of the treated fabric and said polyfunctional crosslinking resin being present in a range of from about 4 to 14 percent, as based on the total weight of the treated fabric.

* * * * *